Jan. 5, 1943.   R. E. MARBURY   2,307,598
PROTECTIVE SYSTEM FOR SERIES CAPACITORS
Filed April 24, 1940
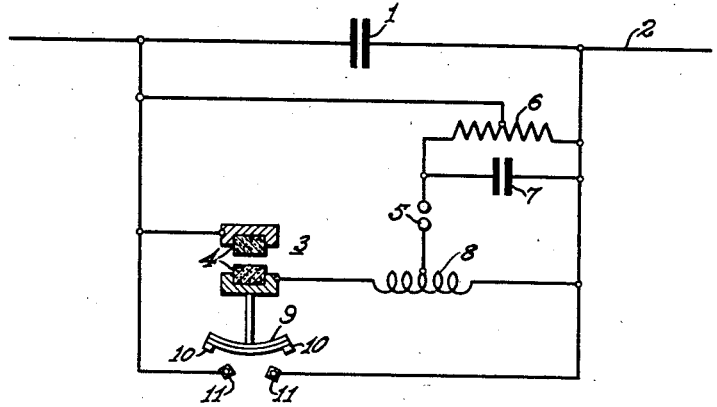
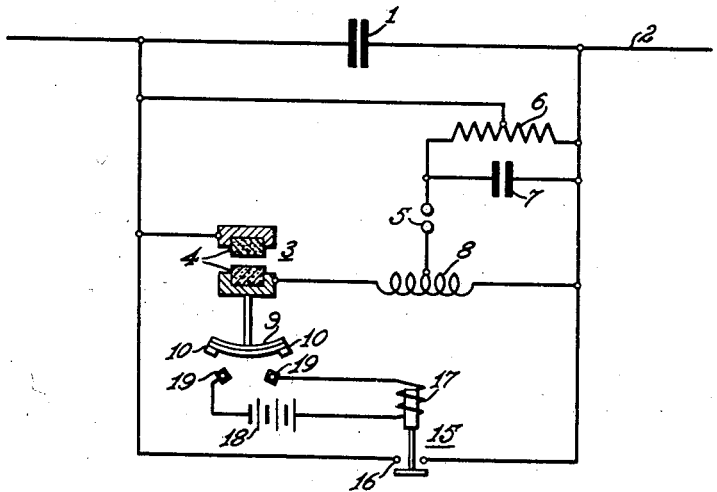

Patented Jan. 5, 1943

2,307,598

UNITED STATES PATENT OFFICE 2,307,598

PROTECTIVE SYSTEM FOR SERIES CAPACITORS

Ralph E. Marbury, Wilkinsburg, Pa., assignor to Westinghouse Electric & Manufacturing Company, East Pittsburgh, Pa., a corporation of Pennsylvania Application April 24, 1940, Serial No. 331,354

3 Claims. (Cl. 175—294)

The present invention relates to protective systems for series capacitors, or similar devices, for the purpose of protecting them against overvoltages caused by abnormal line currents.

Capacitors are sometimes connected in series with alternating current transmission and distribution lines to neutralize some or all of the line inductance and thus improve the voltage regulation of the line and the stability of the system. Capacitors may also be connected in series with certain types of electrical apparatus, such as furnaces and welders, to neutralize a part of the inductance of the apparatus and of the circuit to which it is connected, thus improving the operation. Since such capacitors are connected in series with the line, they carry the line current, and the voltage across the capacitor is proportional to the current. For this reason, the capacitor might be subjected to very high voltages in case of a short circuit on the line or a very heavy overload causing an abnormally high current.

Capacitors of the type use as series capacitors are usually designed to withstand overvoltages of 150% of the rated voltage for very short periods and 200% momentarily, and it is necessary to provide some protective means for shunting the capacitor if the voltage exceeds this value even for an instant. Since this shunting device must operate substantially simultaneously with the occurrence of the overvoltage, spark gaps or other discharge devices are usually utilized for this purpose, and it is desirable to shunt the gap or discharge device as soon as it breaks down in order to prevent damage to the gap, since the current traversing it may be very large. It is also desirable to keep the cost of the protective equipment as low as possible, since there are many applications for series capacitors in which relatively small capacitor units would be required, and the use of series capacitors for such applications has been seriously restricted by the cost of the available protective equipment which, in many cases, would be more than the cost of the capacitor itself in relatively small installations.

One object of the present invention is to provide a simple and inexpensive protective system for series capacitors, using a gap device which breaks down and shunts the capacitor when the voltage exceeds a predetermined value, and having means for shunting the gap immediately after it has broken down.

A further object of the invention is to provide a protective system for series capacitors using a gap device to shunt the capacitor when the voltage exceeds a predetermined value and having means for establishing a shunt circuit around the gap and the capacitor immediately after the gap has broken down, and in which the shunt is removed after a more or less definite time interval to restore the capacitor to service.

A more specific object of the invention is to provide a protective system for a series capacitor having a gap device to shunt the capacitor when the voltage exceeds a predetermined value and a thermally responsive device actuated by the heat of the discharge across the gap for completing a shunt circuit around the gap.

Other objects and advantages of the invention will be apparent from the following detailed description, taken in connection with the accompanying drawing, in which—

Figure 1 is a schematic diagram showing one embodiment of the invention; and

Fig. 2 is a similar diagram showing another embodiment of the invention.

The invention is shown in Figure 1 as applied for the protection of a series capacitor 1 connected in series with an alternating current line 2. The line 2 may be one phase of a three-phase transmission or distribution line, or it may be a part of the supply circuit for a piece of electrical apparatus, such as an electric furnace or welder, or it may be any other alternating current line in which it is desired to introduce series capacitance.

The capacitor is protected against overvoltages by a main spark gap device 3, which is preferably of the type shown in a patent to R. E. Marbury and W. H. Cuttino, No. 2,144,503, issued January 17, 1939, and assigned to the Westinghouse Electric & Manufacturing Company. This gap has massive carbon electrodes 4 having large heat storage capacity which prevents overheating of the electrodes so that the gap is capable of carrying heavy currents, and it has a low recovery voltage so that there is no tendency to produce high oscillatory voltages in the circuit consisting of the capacitor and the gap.

The breakdown voltage of the gap 3 is preferably made higher than the maximum voltage that can be permitted across the capacitor 1 in order to avoid the necessity of accurately calibrating the gap at a low voltage and maintaining the calibration unchanged, and an auxiliary gap device and oscillatory circuit are used to trip off the main gap device 3. The auxiliary gap and oscillatory circuit are described and claimed in a patent to R. E. Marbury, No. 2,072,717, issued March 2, 1937, and assigned to the Westinghouse Electric & Manufacturing Company. As described in the patent, the auxiliary gap device 5 preferably has metal electrodes so as to be capable of rather sensitive calibration, and in order to permit accurate calibration of the breakdown voltage of this gap, it is desirable to set it for a higher voltage than the maximum permissible voltage across the capacitor 1. A small autotransformer 6 is used to step up the voltage on the auxiliary gap 5 and the gap 5 is adjusted to break down when the voltage across the capacitor 1 reaches 200% of its rated voltage. The auxiliary gap 5 is included in an oscillatory circuit consisting of a small capacitor 7 and an inductance 8, which may consist merely of a few turns of wire in air. The inductance 8 is also included in the shunt circuit of the main gap device 3, so that the high voltage oscillations of high frequency, which are set up in the auxiliary oscillatory circuit when the gap 5 breaks down are applied to the main gap device 3 and cause it to break down.

It is desirable to shunt the main gap device 3 immediately after it has broken down in order to prevent excessive burning of the electrodes or damage to the surrounding structures by the arc, since the current traversing the gap may be very high, and for this purpose a thermally responsive device is provided which is arranged to be actuated by the heat of the arc. The thermally responsive device is preferably a relatively large bimetallic disc 9 which, as shown diagrammatically in Fig. 1, is mounted closely adjacent the gap 3 so as to be subjected to the heat of the discharge. The bimetallic disc 9 has contacts 10 mounted on it which are arranged to engage stationary contacts 11 when the disc flips over as a result of being heated by an arc across the gap 3. The engagement of these contacts completes a shunt circuit through the disc 9 around both the capacitor 1 and the gap device 3, thus carrying the short circuit current or overload current around the capacitor and protecting it from the overvoltage which would otherwise appear across it.

The operation of this system should now be apparent. If a short circuit occurs on the line 2, or a heavy overload or any other abnormal condition occurs which causes a current to flow in the line 2 which would produce an overvoltage on the capacitor 1, the auxiliary gap 5 breaks down as soon as the current reaches 200% of its normal value. As soon as the gap 5 has broken down, high voltage oscillations at high frequency are set up in the auxiliary circuit consisting of the capacitor 7 and inductance 8, and since this inductance is included in the circuit of the main gap device 3, this high voltage is applied to the main gap and causes it to break down, thus shunting the capacitor 1. When the gap 3 has broken down, a large amount of heat is generated by the arc formed between the electrodes, and this heat rapidly raises the temperature of the bimetallic disc 9, which is mounted closely adjacent to the gap 3, so that it flips almost immediately after the arc is established, thus closing the contacts 10 and 11 and completing a shunt circuit around both the capacitor 1 and the gap 3. As soon as this shunt circuit is completed, the voltage across the gap device 3 drops to substantially zero and the arc is extinguished. The bimetallic disc 9 immediately begins to cool, and after a certain more or less definite time interval, it flips back to its initial position, thus interrupting the shunt circuit and restoring the capacitor 1 to service. In most cases, this time interval will be long enough for a short circuit to be cleared by the usual protective devices for the line or for the abnormal overload to be relieved. In case the abnormal condition still exists when the shunt circuit is interrupted, the auxiliary gap 5 will immediately break down again, thus causing breakdown of the main gap and operation of the bimetallic disc 9 to again complete the shunt circuit, as described above, so that the capacitor is fully protected.

The bimetallic disc is preferably made rather large and heavy, since it is required to carry the heavy short circuit current flowing in the line 2, at least for a short period. The contacts 10 are placed at the periphery of the disc and any necessary number of contacts may be used, depending on the magnitude of the current which they will be required to interrupt, but at least two contacts 10 should be provided in order to have at least two breaks in series. Any suitable arrangement of the stationary contacts 11 may be used, and in some cases it may be desirable to have these contacts backed up by springs so that they will follow the disc up to the flat position when the disc flips, thus giving a quick break.

Fig. 2 shows another embodiment of the invention which may be used when it is not considered desirable for the bimetallic disc 9 to carry the line current. In this embodiment of the invention, a contactor 15 is used having contacts 16 which are connected in a shunt circuit around the series capacitor 1 and the main gap device 3. The contactor 15 has an operating coil 17 which is connected to any suitable source of energizing potential, shown diagrammatically as a battery 18, in series with the fixed contacts 19. The contacts 19 are arranged to be engaged by the movable contacts 10 on the bimetallic disc 9 to complete the circuit for energizing the coil 17.

It will be clear that the operation of this embodiment of the invention is essentially the same as that described above in connection with Fig. 1. When the disc 9 is heated by a discharge across the gap 3, it flips over and its contacts 10 engage the stationary contacts 19. This completes the circuit for the operating coil 17 of the contactor 15 and causes it to close its contacts 16, thus completing the shunt circuit around the capacitor 1 and main gap device 3. This embodiment of the invention has the advantage that the bimetallic disc 9 is not required to carry the heavy short circuit current flowing in the line 2, and that the contacts 10 and 19 are not required to interrupt the line current. For this reason, a smaller and lighter disc and smaller contacts can be used. It is to be understood, of course, that various other arrangements may be used for causing the contactor 15 to close its contacts 16 when the bimetallic disc 9 flips over after it has been heated. Thus, the movement of the disc may be used to release a latch and permit the contactor to close, or other similar arrangements, which are well known in the art, may be utilized.

It should now be apparent that a protective system has been provided for series capacitors which is relatively simple and inexpensive, but which is positive and reliable in operation. The invention is capable of various modifications and embodiments. Thus, any type of thermally responsive device may be used which can be mounted close to the main gap device 3 so as to be actuated by the heat of the arc, and any suitable arrangement may be used for completing a shunt circuit around the gap device 3 in response to actuation of the thermally responsive device. The invention is not restricted, therefore, to the particular embodiments shown and described for the purpose of illustration, but in its broader aspects, it includes all equivalent embodiments and modifications which come within the scope of the appended claims.

I claim as my invention:

1. A series capacitor equipment for an alternating current line comprising a capacitor connected in series with the line, a main gap device shunting the capacitor to bypass the line current under excess-current conditions, and shunting means for establishing a shunt circuit around the gap and the capacitor, said shunt circuit being capable of carrying the full line current, said shunting means including a thermally-responsive device disposed in heat-receiving relation to said main gap device so as to be heated by a discharge across the gap, said thermally-responsive device being adapted to effect completion of said shunt circuit substantially immediately after a discharge commences across said gap, said thermally-responsive device being substantially unaffected by the current flowing in the shunt circuit and being adapted to cool sufficiently after the discharge is extinguished by completion of the shunt circuit to effect interruption of the shunt circuit at a more or less definite time interval after it is completed, said time interval being substantially independent of the magnitude of the current in the shunt circuit.

2. A series capacitor equipment for an alternating current line comprising a capacitor connected in series with the line, a main gap device shunting the capacitor to bypass the line current under excess-current conditions, and shunting means for establishing a shunt circuit around the gap and the capacitor, said shunt circuit being capable of carrying the full line current, said shunting means including a thermally-responsive device disposed in heat-receiving relation to said main gap device so as to be heated by a discharge across the gap, said thermally-responsive device having a non-actuated position and an actuated position and having contacts thereon which engage stationary contacts to complete said shunt circuit in its actuated position, said thermally-responsive device being adapted to change from its non-actuated position to its actuated position substantialy immediately after a discharge commences across said gap, said thermally-responsive device being substantially unaffected by the current flowing in the shunt circuit and being adapted to cool sufficiently after the discharge is extinguished by completion of the shunt circuit to return to its non-actuated position and thus effect interruption of the shunt circuit at a more or less definite time interval after it is completed, said time interval being substantially independent of the magnitude of the current in the shunt circuit.

3. A series capacitor equipment for an alternating current line comprising a capacitor connected in series with the line, a main gap device shunting the capacitor to bypass the line current under excess-current conditions, and shunting means for establishing a shunt circuit around the gap and the capacitor, said shunt circuit being capable of carrying the full line current, said shunting means including a thermally-responsive device disposed in heat-receiving relation to said main gap device so as to be heated by a discharge across the gap, a contactor having its contacts connected to complete said shunt circuit when they are closed, said thermally-responsive device having a non-actuated position and an actuated position, and means for effecting closure of said contactor when the thermally-responsive device is in its actuated position, said thermally-responsive device being adapted to change from its non-actuated position to its actuated position substantially immediaely after a discharge commences across said gap, said thermally-responsive device being substantially unaffected by the current flowing in the shunt circuit and being adapted to cool sufficiently after the discharge is extinguished by completion of the shunt circuit to return to its non-actuated position and thus effect interruption of the shunt circuit at a more or less definite time interval after ti is completed, said time interval being substantially independent of the magnitude of the current in the shunt circuit.

RALPH E. MARBURY.